Aug. 7, 1962 — W. H. PHILLIPS — 3,048,283
TRUCK ELEVATOR
Filed Aug. 19, 1959 — 3 Sheets-Sheet 1
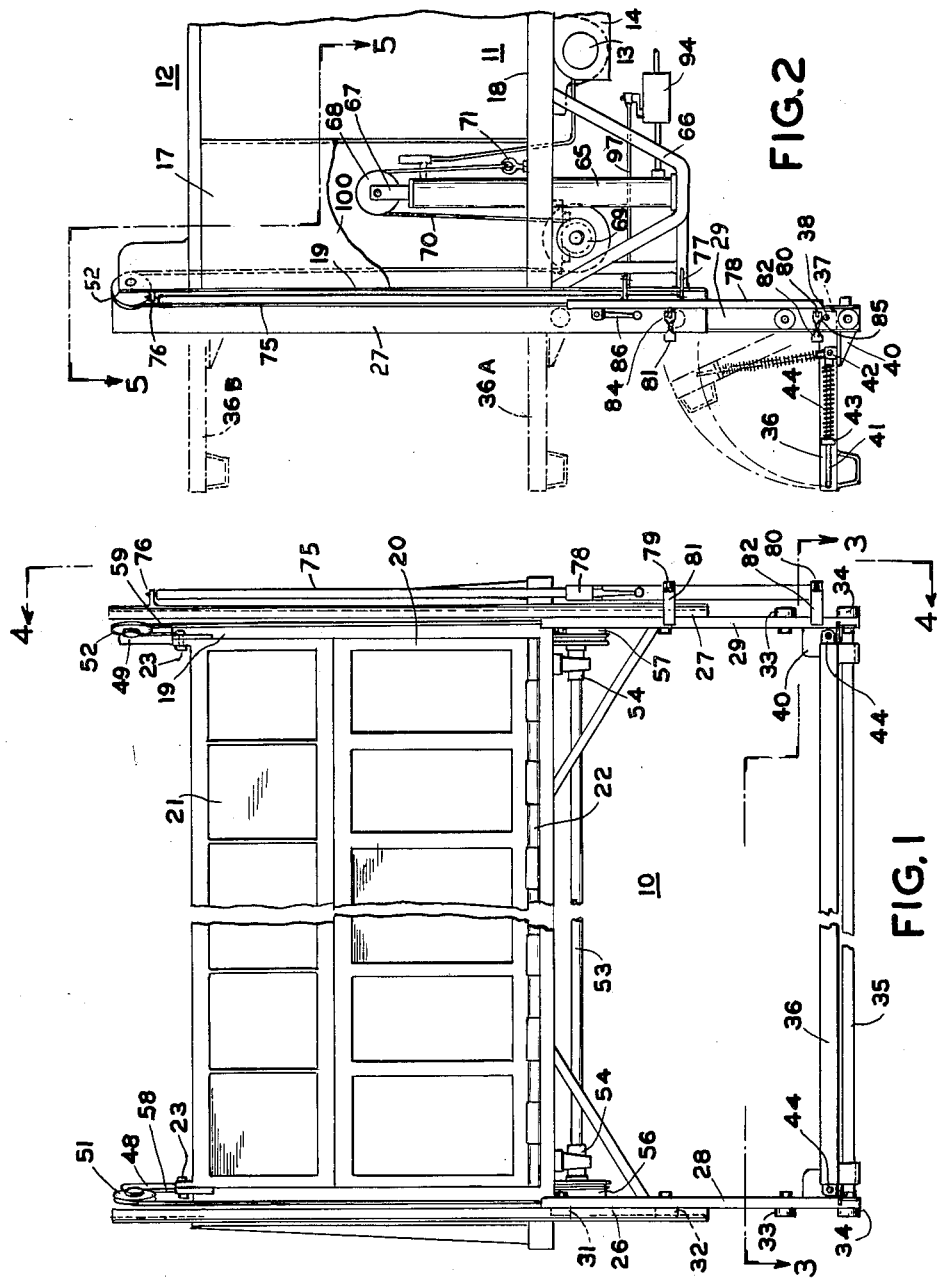
INVENTOR.
WILLIAM H. PHILLIPS
BY Woodling and Krost,
attys.

Aug. 7, 1962 W. H. PHILLIPS 3,048,283
TRUCK ELEVATOR
Filed Aug. 19, 1959 3 Sheets-Sheet 2
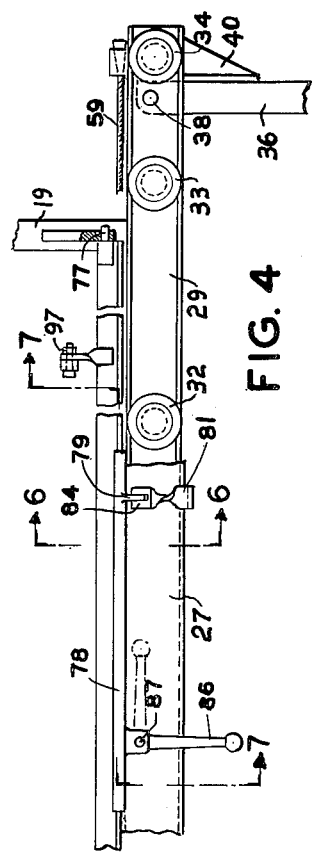
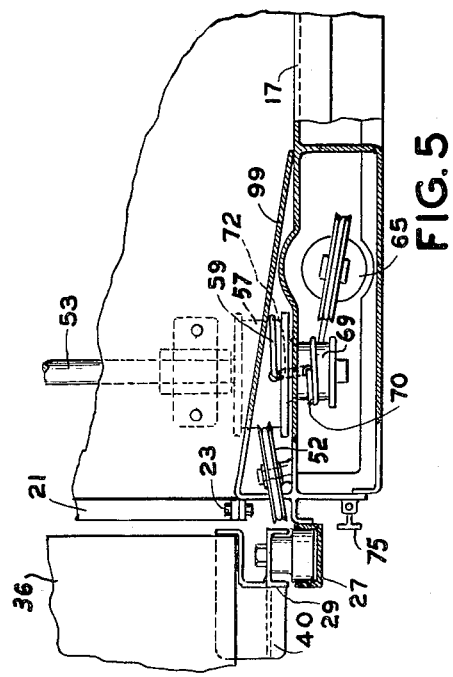
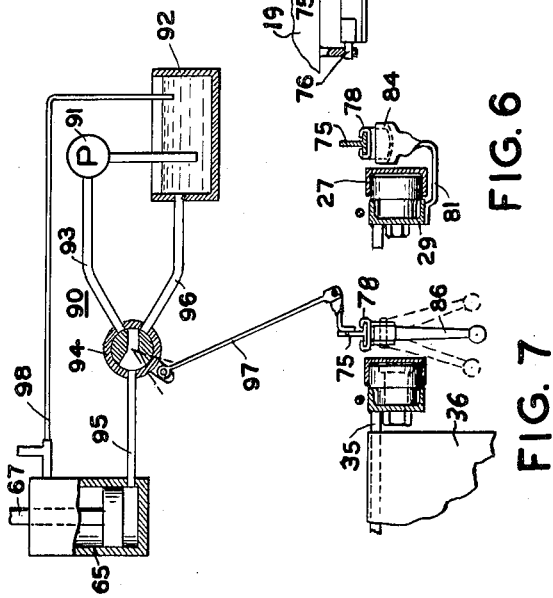
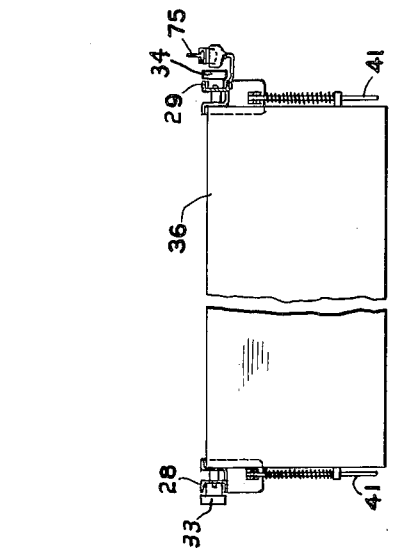
INVENTOR.
WILLIAM H. PHILLIPS
BY Woodling and Kroot,
attys.

Aug. 7, 1962 W. H. PHILLIPS 3,048,283
TRUCK ELEVATOR
Filed Aug. 19, 1959 3 Sheets-Sheet 3
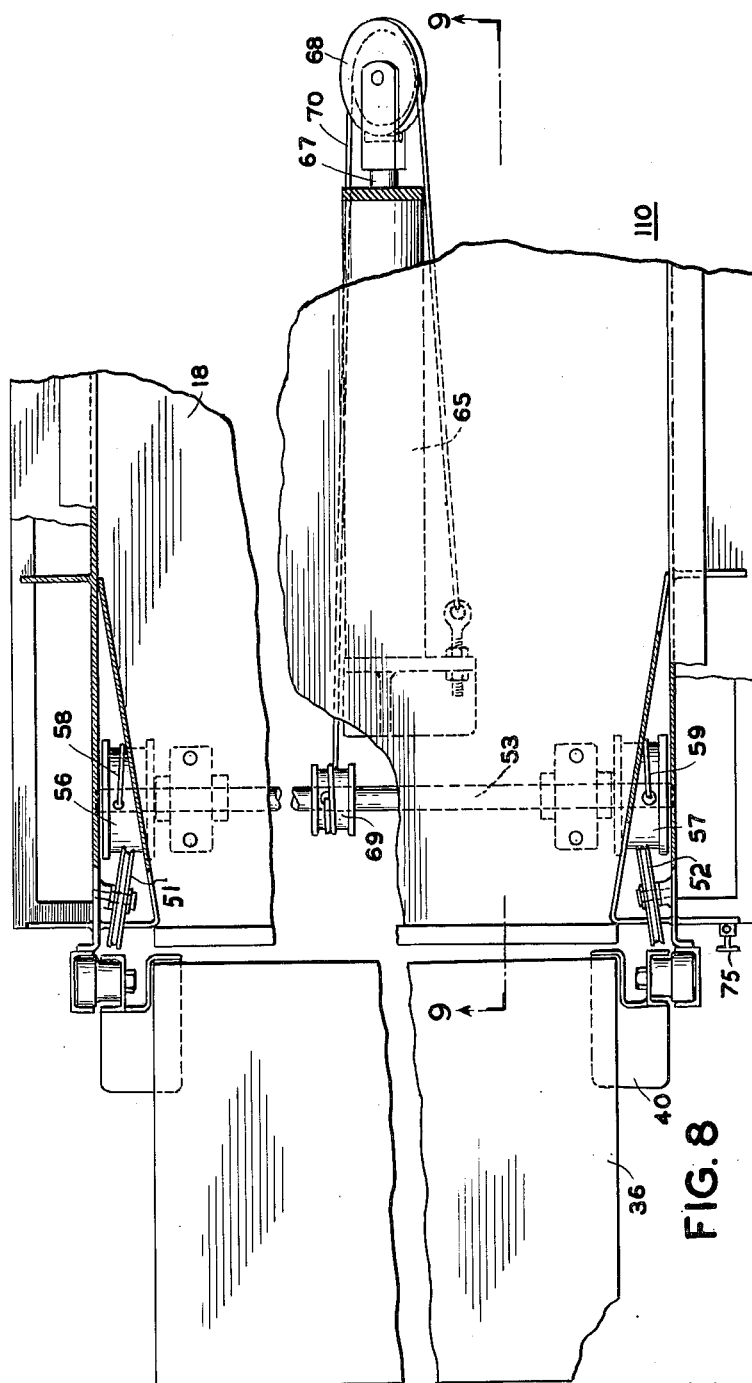
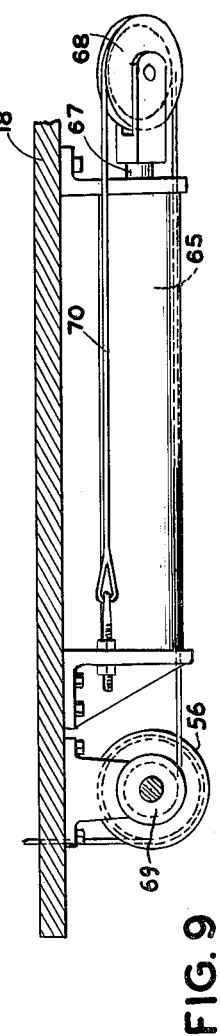
INVENTOR.
WILLIAM H. PHILLIPS
BY Woodling and Krost,
attys.

United States Patent Office 3,048,283
Patented Aug. 7, 1962

3,048,283
TRUCK ELEVATOR
William H. Phillips, 3395 W. 63rd St., Cleveland 2, Ohio
Filed Aug. 19, 1959, Ser. No. 834,856
8 Claims. (Cl. 214—75)

The invention relates in general to an elevator or lift gate for vehicles and more particularly to a high-lift tail gate for a truck body or the like, wherein the tail gate may be raised to a much higher level than the floor of the truck body, and also the tail gate may be controlled from a position fixed relative to the tail gate.

Many vehicles, such as trucks, have had incorporated therein some form of lift gate, generally a tail gate which is power operated so that heavy loads may be raised from ground level to the level of the floor of the truck body. As loads and mechanization have increased, the desirability of such tail gate mechanisms has increased. Several such tail gate mechanisms have been built as accessory or auxiliary equipment which may be mounted on a truck body other than at the time of manufacture of the truck body. As such, the tail gate mechanism is made completely independent from the truck body and later mounted to it or to the truck chassis in a place which is as out of the way as much as possible. Because of the desirability of making such tail gate mechanisms universal of application to many different truck bodies, they necessarily have in the past, been quite cumbersome and have operated at a mechanical disadvantage necessitating parts of considerably greater strength and weight for the lifting capabilities of the tail gate than should be the case if the tail gate mechanism were incorporated as a part of the truck at the time of manufacture. This means that such tail gate mechanisms have been heavy and expensive considering the results obtained.

Also, many of the presently available tail gate structures have not been of the high-lift variety, and are merely constructed to raise from ground level to the level of the floor of the truck body, and hence, are of limited value.

Accordingly, an object of the present invention is to provide a high-lift tail gate mechanism which is simple, reliable and light in weight for its lifting capacity.

Another object of the invention is to provide a tail gate mechanism which may be mounted on an existing truck body other than at the time of manufacture of the truck body.

Still another object of the invention is to provide a lift gate mechanism which may be readily attached to any number of currently manufactured truck bodies.

Still another object of the invention is to provide a tail gate mechanism which is separate from and operated independently of other tail gates on the truck body.

Still another object of the invention is to provide a tail gate mechanism which may be raised and lowered from ground level to the top of the sides of the truck for a high-lift operation and wherein the control for the tail gate is maintained at a fixed height above the tail gate for ease of manipulation by an operator riding on the tail gate.

Still another object of the invention is to provide a tail gate mechanism for a vehicle which is cable operated from a hydraulic cylinder with a high-lift being obtained, yet without extraordinarily long travel of the hydraulic cylinder.

Other objects and a fuller understanding of the invention may be had by referring to the following description and claims, taken in conjunction with the accompanying drawings, in which:

FIGURE 1 is a rear elevational view of a truck body incorporating the lift gate mechanism of the present invention;

FIGURE 2 is a side elevational view of the lift gate mechanism;

FIGURE 3 is a sectional view on line 3—3 of FIGURE 1;

FIGURE 4 is an enlarged sectional, partial view on line 4—4 of FIGURE 1;

FIGURE 5 is an enlarged sectional view on line 5—5 of FIGURE 2;

FIGURE 6 is a sectional view on line 6—6 of FIGURE 4;

FIGURE 7 is a sectional view on line 7—7 of FIGURE 4 and showing diagrammatically the hydraulic circuit;

FIGURE 8 is a top view of a modification of the invention; and

FIGURE 9 is a section on line 9—9 of FIGURE 8.

The FIGURES 1 to 7 show a lift gate mechanism 10 which may be mounted on a vehicle, such as a truck, which, in this case, has been shown as a dump truck 11. This dump truck 11 has a body 12 which may be raised by any suitable mechanism, not shown, about a pivot 13 on the chassis 14 of the truck 11. The truck body 12 has side panels 17 and a bottom or floor panel 18. The rear edge of these side and bottom panels form a rear frame 19 which defines a rear opening for the truck body 12. The truck body may have more or less conventional closures for this rear opening which may include a lower gate 20 and an upper gate 21. The lower gate 20 is pivoted on a horizontal hinge 22 and the upper gate is pivoted on upper pivot means 23. These upper and lower gates may be manually operated 180° from opened to closed positions. Thus, the lower gate drops and the upper gate raises upwardly 180° to open the rear opening of the truck body 12.

The lift gate mechanism 10 may be applied to the truck body described or other truck bodies, and the aforesaid truck body has been described merely for purposes of illustration of one body with which the lift gate mechanism 10 may be used. This lift gate mechanism 10 includes first and second vertically disposed channel guides 26 and 27 wherein these channel guides are opposedly facing each other. The channel guides are fixed by any suitable means, such as welding, to the rear frame 19 at the side panels 17. First and second movable vertical support members 28 and 29 are shown as being in the form of channels and each journals first, second, third and fourth rollers 31, 32, 33 and 34, respectively. These rollers 31, 32, 33 and 34 are adapted to engage the inner surfaces of the channel guides 26 and 27 to guide the support members 28 and 29 for vertical movement. A crosspiece 35 fastens together the support members 28 and 29 and a tail gate or elevator 36 is pivoted at the front edge 37 thereof by a pivot 38 to the support members 28 and 29. Angle brackets 40 at the bottom of each of the support members 28 and 29 support the tail gate 36 in its down or horizontal position and the pivot 38 permits this tail gate to be swung upwardly about 90° to a vertical position so that it may be folded more compactly for movement of the truck 11. Toggle rods 41 are pivoted at 42 to the angle brackets 40 and extend through flanges 43 on the sides of the tail gate 36. A compression spring 44 surrounds each rod 41 so that this spring is compressed when the tail gate 36 is in the horizontal position and helps urge the tail gate upwardly into a folded vertical position. Thus, a latch to hold the tail gate 36 in the vertical position is obviated, and additionally the springs help the operator in lifting the tail gate to the folded position.

First and second fixed vertical posts 48 and 49 are mounted on the rear frame 19 and extend upwardly above the top of the side panels 17. First and second pulleys 51 and 52 are horizontally journalled on these fixed posts.

A horizontal drive shaft 53 is journalled in bearings 54 transversely of the truck body 12 just below the floor 18 and near the rear frame 19. First and second large diameter cable drums 56 and 57 are fixed on the drive shaft near the two ends thereof. First and second cables 58 and 59 are fixed to the bottom of the first and second support members 28 and 29 and extend upwardly over the first and second pulleys 51 and 52, respectively, and downwardly to wrap around the first and second large diameter drums 56 and 57, respectively.

A hydraulic cylinder 65 is vertically mounted in a cradle 66 on one side panel 17 near the rear frame 19. This cylinder 65 has a piston rod 67 which moves vertically upwardly out of the cylinder 65 and which carries a cable pulley 68 on the upper end thereof. A small diameter cable drum 69 is fixed to one end of the drive shaft 53 and a third cable 70 is fixed to the truck body at 71 and passes upwardly over the cable pulley 68 and downwardly to wrap around the small diameter cable drum 69. The cable drums 57 and 69 are adjacent; hence, the second and third cables 59 and 70 may actually be in one piece and pass through an internal passageway 72 in the cable drums and to be clamped thereto.

A control shaft 75 is mounted on first and second vertical pivots 76 and 77 which are fixed on the rear frame 19. This control shaft is shown as being T-shaped, but may have any other non-circular configuration. The first and second vertical pivots are near the top and bottom of the channel guide 27 and substantially coextensive therewith. A control bar or sleeve 78 in the form of a channel wraps around approximately 270° of the periphery of the flange of the T-shaped control shaft 75. This provides for vertical sliding telescoping movements and for concurrent arcuate movements of the control shaft 75 and control bar 78. First and second horizontal plates 79 and 80 are fastened, as by welding, to the control sleeve 78. First and second support arms 81 and 82 are fixedly attached, as by welding, to the second support member 29. First and second yokes 84 and 85 are fixedly carried on the ends of the support arms 81 and 82, respectively, to straddle the horizontal plates 79 and 80, respectively, so as to maintain the control sleeve 78 in a fixed position vertically relative to the tail gate 36 in its horizontal position. The horizontally disposed yokes 84 and 85 and the cooperating horizontal plates 79 and 80 permit arcuate movement of the control sleeve 78 and control shaft 75. A manual handle 86 is pivoted on a horizontal pivot to the control sleeve 78 so that horizontal swinging movements of the manual handle 86 are imparted to the control sleeve 78, and hence, to the control shaft 75.

The lower end of the control sleeve 78 is near the lower end of the support member 29; hence, when the tail gate 36 is at ground level, as shown in FIGURES 1 and 2, this control sleeve 78 extends below the control shaft 75. At the same time, the support members 28 and 29 extend below the bottom of the channel guides 26 and 27; hence, only the first and second rollers 31 and 32 interengage the channel guides and support members at this time. The channel guides 26 and 27 do not extend much above the top of the side panels 17 in order to maintain a low overall height of the truck 11; hence, when the tail gate 36 is in its topmost position, shown dotted at 36B in FIGURE 2, the support members 28 and 29 extend above the channel guides 26 and 27. Also at this time, only rollers 33 and 34 interengage the channel guides and support members. Also, when this tail gate is in the topmost position 36B the control sleeve 78 extends above the top of the control shaft 75, but the bottom of the control sleeve 78 is still telescopingly engaged with the control shaft 75. The fact that the control sleeve 78 is in the form of a channel which circumscribes more than 180° but less than 360° of a portion of the control shaft, permits the tongue of the T-shaped control shaft 75 to extend outwardly to engage the vertical pivots 76 and 77 and permits the control sleeve 78 to longitudinally vertically pass these vertical pivots.

FIGURE 7 diagrammatically shows a hydraulic circuit 90 which includes a hydraulic pump 91 which may be driven in any manner, for example, from the engine of the truck 11. This pump draws hydraulic fluid from a reservoir or sump 92 and establishes fluid pressures in a conduit 93 connected to a three-way valve 94. This valve has an outlet conduit 95 connected to the bottom of the hydraulic cylinder 65 so as to force outwardly the piston rod 67. A return conduit 96 connects the valve 94 and the sump 92. The valve 94 is shown in the neutral position and is connected by a linkage 97 to the control shaft 75 so as to be moved one way or the other from neutral as the control shaft 75 is moved one way or the other from the neutral position shown in FIGURE 7. In a first position the conduits 93 and 95 are connected so that fluid pressure is admitted to the bottom of the cylinder 65 and, accordingly, air or any leakage fluid may be returned through a bypass conduit 98 to the sump 92. In a second position the conduits 95 and 96 are connected to empty the bottom of the hydraulic cylinder 65, and hence, to lower the tail gate 36. In the neutral position shown, the piston rod 67 is locked against movement; hence, the tail gate 36 is held stationary in a selected position, including a position 36A shown level with the floor 18.

With pressure fluid in the bottom of the cylinder 65, the piston rod 67 moves upwardly to unwind the third cable 70 from the cable drum 69. This rotates the cable drum 69 and drive shaft 53 in a counterclockwise direction as viewed in FIGURE 2. Accordingly, the cables 58 and 59 are wound on the cable drums 56 and 57 and this raises the support members 28 and 29 and the tail gate 36. Gravity acts on the tail gate 36 to lower it when the valve is moved to the second position interconnecting conduits 95 and 96. The manual handle 86 always remains in a fixed vertical position relative to the tail gate pivot 38 so that an operator may ride on the tail gate even to the topmost position 36B thereof and still conveniently be able to reach the manual handle 86 for control of the tail gate 36.

The interconnection of the control sleeve 78 and control shaft 75 assures that the arcuate movement of the control sleeve 78 is passed to the valve 94 for control of the hydraulic cylinder or power means 65 which actuates the tail gate 36. The cables and cable drums and the interconnection on the truck body 12 has a ratio of 4:1 in movement of the tail gate 36 relative to movement of the piston rod 67. This is because the piston rod 67 moves the pulley 68 rather than one end of cable 70 and because of the 2:1 ratio in diameter of the cable drums 56 and 57 relative to the cable drum 69. The lift gate mechanism 10, therefore, achieves a large vertical movement of the tail gate, approximately eight feet or more in height for only a two-foot movement of the piston rod 67. This permits use of a hydraulic cylinder which is only slightly over two feet in length, and hence, even when the piston rod 67 is fully extended the total height of the piston rod and cylinder 65 does not extend above the fixed posts 48 and 49 and may not extend above the side panels 17. The entire lift gate mechanism 10 is quite compact and occupies little space on the rear end of the truck body 12 and the combined width of the support members and channel guides is sufficient narrow so as to maintain practically a full rear opening of the truck body 12. The hydraulic cylinder 65 and associated mechanism may easily be placed outside the side panels 17 and outside a tapered wall 99, shown in FIGURE 5, and yet inside the outmost limit of the side panels 17. This mechanism, including the hydraulic cylinder 65, may be easily covered by a panel 100 as shown in FIGURE 2.

The telescoping connection of the control sleeve 78 and control shaft 75 is along a vertical or first path and the arcuate concurrent movement of the control sleeve 78 and control shaft 75 is along a second path, which is transverse to or perpendicular to the vertical movement of the control bar 78 and support members 28 and 29. The fact that these two paths are perpendicular permits the vertical sliding telescoping movements of the control bar or sleeve 78 and control shaft 75 without effecting actuation of the valve 94. Also, the valve 94 may be actuated by pivoting the manual handle 86 regardless of the vertical position of the tail gate 36.

The fact that the lift gate mechanism 10 is narrow along each side panel 17 permits the upper and lower gates 21 and 20 to be practically the full width of the body 12 and to be operated independently of the tail gate 36. As long as the tail gate 36 is in a non-interfering position, one or both of the lower and upper gates 20 and 21 may be opened or closed as desired. With these lower and upper gates either closed or opened completely, then the tail gate 36 may be vertically moved past them to any position. With the upper and lower gates closed, the tail gate 36 may be moved to the topmost position 36B and material dumped into the body 12 from the tail gate 36.

FIGURES 8 and 9 show a modification of the invention wherein similar parts are shown with the same reference numerals as in FIGURES 1 to 7. This modification of FIGURES 8 and 9 shows a lift gate mechanism 110 wherein the drive shaft 53 has the small diameter drum 69 mounted near the center thereof.

The hydraulic cylinder 65 extends horizontally beneath the floor 18 and is fixed thereto. The piston rod 67 moves horizontally out of the cylinder 65 toward the front of the truck 11 and the cable 70 has one end attached to the truck body 12 and extends over the cable pulley 68 and wraps around the cable drum 69. The fact that this cable drum 69 is near the center of the drive shaft 53 makes the torque on the drive shaft 53 symmetrical about the center; hence, a lighter weight drive shaft may be used. Also, the cylinder 65 is placed underneath the bed of the truck body 12 to be out of the way and to be more protected. Other details of the lift gate mechanism 110 may be the same as in the preferred embodiment.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An elevator lift gate mechanism for a vehicle comprising, guide means fixed to said vehicle and having a vertical component, a movable support member guided by said guide means, a movable lift gate fastened to said support members for movement therewith in a first path, power means to raise and lower said lift gate along said first path, a control shaft, means mounting said control shaft on said vehicle for movement in a second path transverse to said first path and with said control shaft approximately coextensive with said guide means, a control bar, one of said control shaft and said control bar circumscribing more than 180° and less than 360° of the periphery of the other for concurrent movement in said second path and for sliding telescoping movements parallel to said first path to longitudinally pass said mounting means, a yoke and intermeshing plate, means mounting said yoke to one of said support member and said control bar and mounting said plate to the other of said support member and said control bar to maintain said control bar fixed relative to said support member in a path parallel to said first path and permitting movement of said control shaft and control bar in said second path, said guide means and said control shaft terminating a first distance above the ground level so that said support member extends below said guide means and said control bar extends below said control shaft with said lift gate at ground level, a manual handle on said control bar, and means connecting said control shaft to actuate said power means, whereby actuation of said manual handle moves said control bar and said control shaft in said second path to actuate said power means to raise and lower said lift gate with said handle being maintained in a fixed condition relative to said lift gate.

2. An elevator lift gate mechanism for a vehicle comprising, vertical guide means fixed relative to said vehicle, a vertically movable support member vertically guided by said guide means, a vertically movable lift gate pivoted to the bottom of said support member, power means to raise and lower said lift gate, vertical pivot means on said vehicle, a control shaft journalled on said vertical pivot means approximately coextensive with said vertical guide means, a control bar, one of said control shaft and said control bar circumscribing more than 180° and less than 360° of the periphery of the other for concurrent arcuate movements and for vertical sliding telescoping movement to longitudinally pass said vertical pivot means, a yoke and intermeshing horizontal plate, means mounting said yoke to one of said support member and said control bar and mounting said horizontal plate to the other of said support member and said control bar to maintain said control bar vertically fixed relative to said support member and permitting arcuate movement of said control shaft and control bar, said vertical guide means and said control shaft terminating a first distance above the ground level so that said support member extends below said guide means and said control bar extends below said control shaft with said lift gate at ground level, a manual handle on said control bar, and means connecting said control shaft to actuate said power means, whereby actuation of said manual handle arcuately moves said control bar and said control shaft to actuate said power means to raise and lower said lift gate with said handle being maintained in a fixed condition relative to said lift gate.

3. An elevator lift gate mechanism for a truck body comprising, vertical guide means fixed to said body, a vertically movable support member vertically guided by said guide means, a vertically movable lift gate pivoted to the bottom of said support member, power means to raise and lower said lift gate, vertical pivot means on said body, a control shaft journalled on said vertical pivot means approximately coextensive with said vertical guide means, a control sleeve circumscribing more than 180° of the periphery of said control shaft for vertical sliding telescoping movements and for concurrent arcuate movements therewith, a peripheral opening less than 180° in said control sleeve to longitudinally pass said vertical pivot means, a yoke and intermeshing horizontal plate, means mounting said yoke to one of said support member and said control sleeve and mounting said horizontal plate to the other of said support member and said control sleeve to maintain said control sleeve vertically fixed relative to said support member and permitting arcuate movement of said control shaft and control sleeve, said vertical guide means and said control shaft terminating a first distance above the ground level so that said support member extends below said guide means and said control sleeve extends below said control shaft with said lift gate at ground level, a manual handle on said control sleeve, and means connecting said control shaft to acuate said power means, whereby actuation of said manual handle arcuately moves said control sleeve and said control shaft to actuate said power means to raise and lower said lift gate with said handle being maintained in a fixed condition relative to said lift gate.

4. A high-lift tail gate mechanism for a truck body comprising, vertical guide means fixed to said body, a vertically movable support member vertically guided by said guide means, a vertically movable lift gate pivoted to the bottom of said support member, power means to raise and lower said lift gate, upper and lower vertical pivots on said body near said guide means, a control shaft journalled on said vertical pivots approximately coextensive with said vertical guide means, a control sleeve circumscribing more than 180° of the periphery of said control shaft for vertical sliding telescoping movements and for concurrent arcuate movements therewith, a peripheral opening less than 180° said control sleeve to longitudinally pass said upper and lower vertical pivots, a yoke and intermeshing horizontal plate, means mounting said yoke to one of said support member and said control sleeve and mounting said horizontal plate to the other to maintain said control sleeve vertically fixed relative to said support member and permitting arcuate movement of said control sleeve and control shaft, said vertical guide means and said control shaft terminating a first distance above the ground level so that said support member extends below said guide means and said control sleeve extends below said control shaft with said lift gate at ground level, said vertical guide means and said control shaft terminating a second distance above the top of said truck body so that said support member extends above said guide means and said control sleeve extends above said control shaft with said lift gate at the level of the top of said truck body, a manual handle on said control sleeve, and means connecting said control shaft to actuate said power means, whereby actuation of said manual handle arcuately moves said control sleeve and said control shaft to actuate said power means to raise and lower said lift gate with said handle being maintained in a fixed condition relative to said lift gate.

5. A high lift-tail gate mechanism for a truck body with a vertical rear frame at the rear thereof, said tail gate mechanism comprising, vertical guide means fixed to said rear frame, vertically movable support members vertically guided by said guide means, a vertically movable tail gate pivoted to the bottom of said support members, power means to raise and lower said tail gate, upper and lower vertical pivots on said rear frame near side guide means, a control shaft journalled on said vertical pivots approximately coextensive with said vertical guide means, a control sleeve circumscribing more than 180° of the periphery of said control shaft for vertical sliding telescoping movements and for concurrent arcuate movements therewith, a peripheral opening less than 180° in said control sleeve to longitudinally pass said upper and lower vertical pivots, a support arm on one of said support members, a yoke end on said support arm, a horizontal plate fixed to said control sleeve and disposed in said yoke end to maintain said control sleeve vertically fixed substantially coextensive with said support member and permitting arcuate movement of said control sleeve and control shaft, said vertical guide means and said control shaft terminating a first distance above the ground level so that said support members extend below said guide means and said control sleeve extends below said control shaft with said tail gate at ground level, said vertical guide means and said control shaft terminating a second distance above the top of said truck body so that said support members extend above said guide means and said control sleeve extends above said control shaft with said tail gate at the level of the top of said truck body, a manual handle on said control sleeve, and means to actuate said power means connected for actuation by arcuate movement of said control shaft, whereby actuation of said manual handle arcuately moves said control sleeve to arcuately move said control shaft to actuate said power means to vertically move said tail gate with said handle being maintained in a fixed condition relative to said tail gate.

6. A high-lift gate mechanism for a truck having a load-carrying body comprising, first and second vertically disposed guide means fixed to said body, first and second movable vertical support members, first, second, third and fourth rollers journalled in each of said support members and disposed for rolling engagement with said first and second fixed guide means, a vertically movable lift gate, pivot means pivoting said lift gate to said support members for vertical movement therewith, a control shaft, means mounting said control shaft on said vehicle for movement in a path transverse to the vertical and said control shaft approximately coextensive with said guide means, a control bar, one of said control shaft and said control bar circumscribing more than 180° and less than 360° of the periphery of the other for concurrent movement in said second path and for vertical sliding telescoping movements to longitudinally pass said mounting means, a yoke and intermeshing plate, means mounting said yoke to one of said support member and said control bar and mounting said plate to the other of said support member and said control bar to maintain said control bar vertically fixed relative to said support member and permitting movement of said control shaft and control bar in said transverse path, said first and second guide means terminating a first distance above the ground level so that only said first and second rollers of each said support member engage said guide means with said lift gate at ground level, and said first and second guide means terminating a second distance above the top of said truck body so that only said third and fourth rollers engage said channel guides with said lift gate at the level of the top of said truck body.

7. A truck elevator mechanism for a truck body comprising, vertical guide means fixed to said body, a vertically movable support member vertically guided by said guide means, a vertically movable elevator fastened to said support member, power means to raise and lower said elevator, vertical pivot means on said body, a control shaft journalled on said vertical pivot means approximately coextensive with said vertical guide means, a control sleeve circumscribing more than 180° of the periphery of said control shaft for vertical sliding telescoping movements and for concurrent arcuate movements therewith, a peripheral opening less than 180° in said control sleeve to longitudinally pass said vertical pivot means, a yoke on said support member, a horizontal plate fixed to said control sleeve and disposed in said yoke to maintain said control sleeve vertically fixed relative to said support member and permitting arcuate movement of said control sleeve and control shaft, said vertical guide means and said control shaft terminating a distance above the top of said truck body so that said support member extends above said guide means and said control sleeve extends above said control shaft with said elevator at the level of the top of said truck body, a manual handle on said control bar, and means to actuate said power means connected for actuation by arcuate movement of said control shaft, whereby actuation of said manual handle arcuately moves said control sleeve to arcuately move said control shaft to actuate said power means to vertically move said elevator with said handle being maintained in a fixed condition relative to said elevator.

8. A truck elevator mechanism for a truck body comprising, vertical guide means fixed to said body, a vertically movable support member means vertically guided by said guide means, a vertically movable elevator fastended to said support member means, power means to raise and lower said elevator including first and second fixed pulleys horizontally journalled at the upper side of said body, a horizontal drive shaft transversely journalled below said truck body, first and second cable drums fixed on said drive shaft near the ends thereof and each having a first large diameter, first and second cables fixed to the bottom of said support member means and extending vertically upward and over said first and second pulleys and downwardly and wrapping around said first and second large diameter drums, a small diameter cable drum fixed to said drive shaft, a cable pulley, piston and cylinder means to move said cable pulley relative to said truck body, and a third cable fixed relative to said truck body and extending over said cable pulley and returning and wrapping around said small diameter cable drum, to effect a distance of movement multiplication of greater than two to one of said elevator movement relative to said cable pulley movement.

References Cited in the file of this patent

UNITED STATES PATENTS

| | | |
|---|---|---|
| 143,013 | Hubbard | Sept. 23, 1873 |
| 1,526,621 | Zaun | Feb. 17, 1925 |
| 2,426,114 | Novotney | Aug. 19, 1947 |
| 2,618,360 | MacDonald | Nov. 18, 1952 |
| 2,640,612 | Barry | June 2, 1953 |
| 2,678,746 | Gibson | May 18, 1954 |
| 2,821,264 | Ulinski | Jan. 28, 1958 |